S. H. KNIGHT.
DISPENSING FAUCET.
APPLICATION FILED MAY 31, 1919.
1,327,162.
Patented Jan. 6, 1920.
2 SHEETS—SHEET 1.
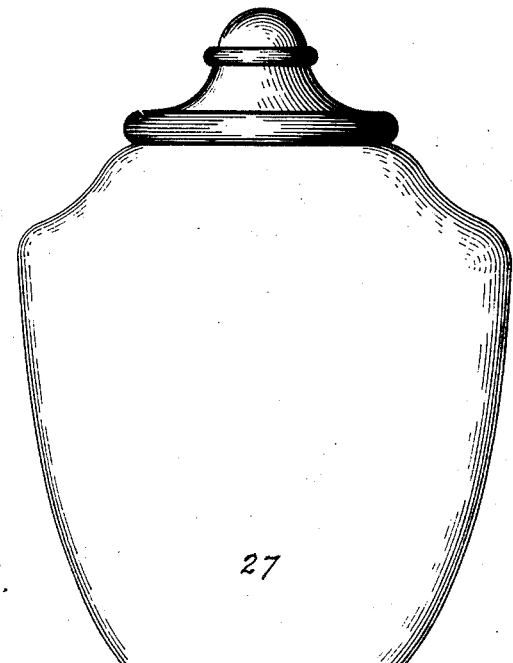
Fig. 1.
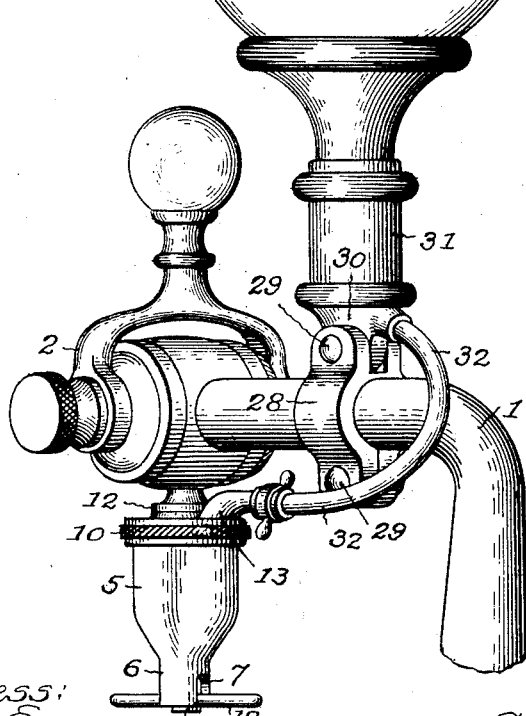
Fig. 2.
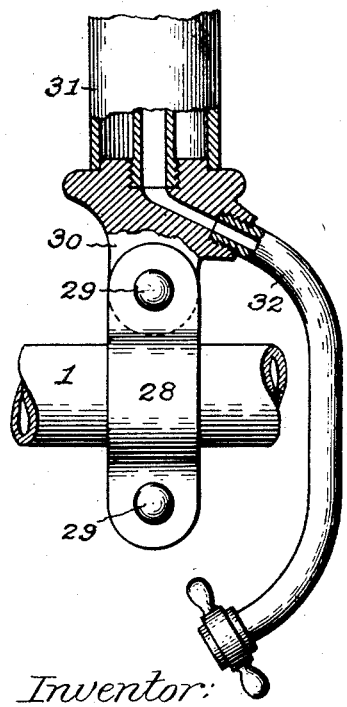
Witness:
John Enders.
Inventor:
Stanley H. Knight,
by Robert Burns
Atty.

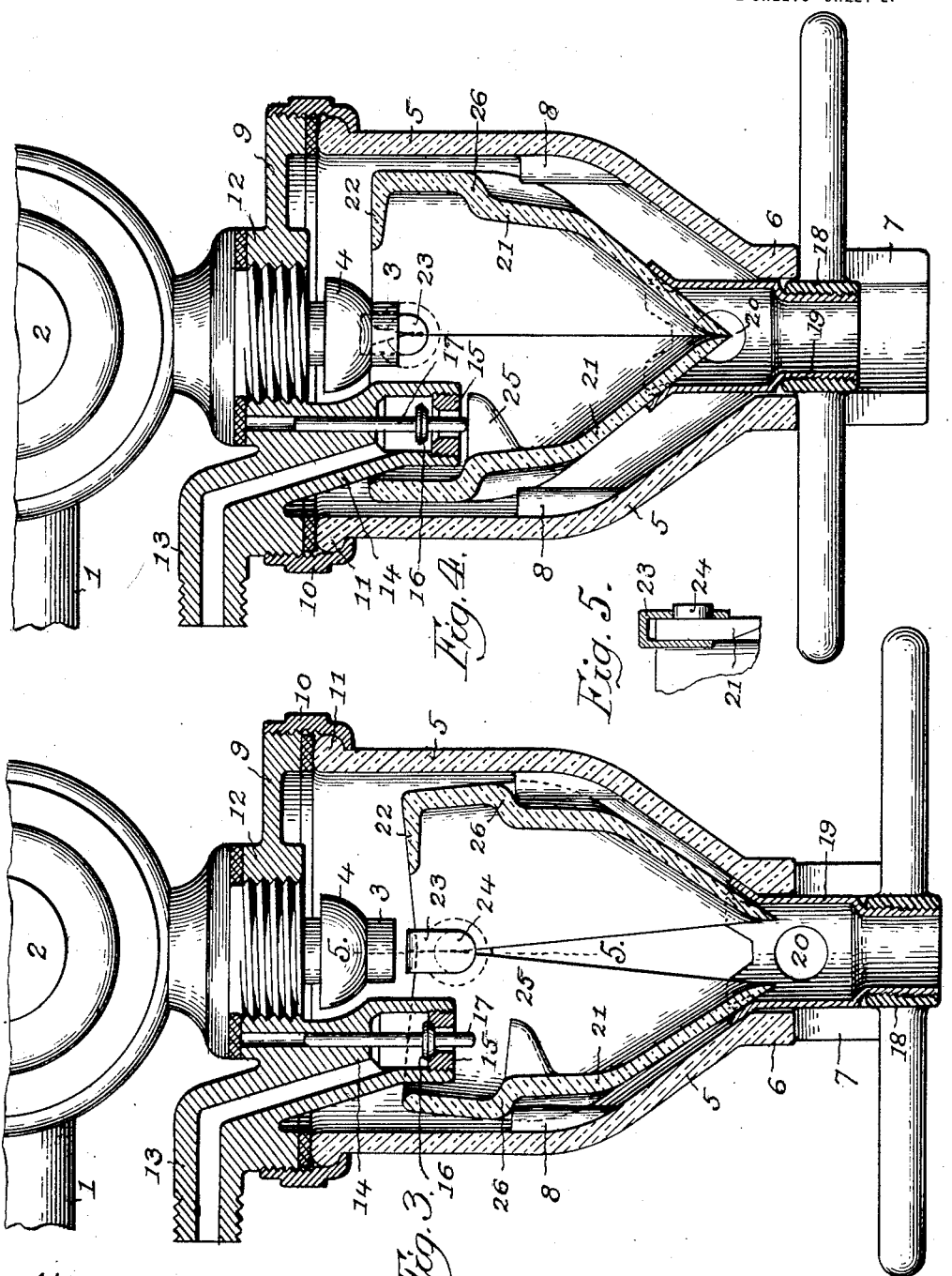

UNITED STATES PATENT OFFICE.

STANLEY H. KNIGHT, OF CHICAGO, ILLINOIS.

DISPENSING-FAUCET.

1,327,162.　　　　　Specification of Letters Patent.　　Patented Jan. 6, 1920.

Application filed May 31, 1919. Serial No. 300,808.

*To all whom it may concern:*

Be it known that I, STANLEY H. KNIGHT, a citizen of the United States of America, and a resident of Chicago, in the county of Cook, State of Illinois, have invented certain new and useful Improvements in Dispensing-Faucets, of which the following is a specification.

This invention relates to that class of dispensing faucets for soda fountain and like uses in which a quantity of syrup or the like, is measured and mixed with carbonated water during or previous to a discharge from the faucet, and the present improvement has for its objects:—

To provide a simple and efficient structural formation and association of parts whereby a quantity of syrup or the like can be conveniently measured off, and either held within the body of the faucet while being thoroughly mixed with the required quantity of carbonated water or the like before being discharged into the drinking glass, or with which the quantity of syrup or the like can be dropped into the drinking glass, and there receive the charge of carbonated water or the like, at the will or desire of the dispensing party.

To provide a special construction of the measuring means above referred to, by which the measured quantity of syrup or the like is held in line with the discharge of carbonated water within the faucet casing for thorough mixture therewith, and which measuring means when in an inactive condition is away from the path of the carbonated water discharge so as not to interfere with the ordinary and general use of such carbonated water, all as will hereinafter more fully appear.

In the accompanying drawings:—

Figure 1, is a perspective view illustrating the general arrangement of parts in the present improvement.

Fig. 2, is a detail sectional elevation illustrating the attachment of the supply tank to the supporting stand of the fixture, and the connection of such supply tank to the measuring means.

Fig. 3, is a central sectional elevation of the measuring means and accessories, with the measuring hopper in its open and lowered position.

Fig. 4, is a companion view showing said measuring hopper in its closed and elevated position.

Fig. 5, is a detail section on line 5—5, Fig. 3.

Like reference numerals indicate like parts in the several views.

Referring to the drawings, 1 designates the usual curved and hollow standard or goose neck of a soda fountain or the like through which the supply of carbonated water or other fluid is conveyed to the usual dispensing valve or faucet 2, which may be of any usual and suitable construction, but preferably of the type which in different adjustments is adapted to discharge a fine and energetic stream of fluid with one adjustment, and with another adjustment to supply a coarse and spray like stream, while with another adjustment to shut-off both of said supplies. In the construction shown in the drawings, the fine stream above referred to flows from the lower outlet neck 3 of said valve or faucet, and the coarser stream flows downward upon the spreader head 4 to be deflected thereby in a cascade form into the hereinafter described casing of the present improvement.

5 designates the main body of the inclosing casing above referred to, preferably of glass or like transparent material, circular in shape and provided with a contracted outlet neck 6 at bottom. The outlet neck 6 is cylindrical in shape and formed with vertical guide slots 7 for the purpose hereinafter stated.

8 designates a plurality of abutment ledges formed on the inner face of the casing 5 for supporting engagement with the measuring hopper or cup hereinafter described.

9 designates a metal cap or cover fitting the open top of the casing 5 aforesaid, and secured thereto by a union or coupling sleeve 10 engaging the margin of the cap or cover 9 and a marginal bead or flange 11 of the casing 5, as shown.

12 designates a central neck on the cap or cover 9 formed with a screw-threaded orifice for engagement with the similarly formed discharge neck of the dispensing valve or faucet 2 above described.

13 designates an inlet neck on the upper side of the cap or cover 9, having a passage communicating with the valve chamber of a depending valve housing 14, which extends downward from the under side of said cap or cover 9 and positioned to one side of the central attaching neck 12 above described.

15 designates a valve seat screwed into the lower end of the aforesaid valve housing 14, and 16 designates a valve head associated with the upper side of said valve seat 15, with the upper end of its valve stem 17 moving in a guide orifice in the housing 14 and with the lower portion of said valve stem extending down below the valve seat 15 for operative engagement with the measuring hopper or cup of the present structure.

18 designates the operating cross-head of the present structure, the cross arms of which have guide movement in the guide slots 7 of outlet neck 6 aforesaid, with said arms projecting beyond said neck so that an upward movement can be imparted to the cross-head by the dispenser pressing upwardly against the cross-arms with the margin of a drinking glass.

19 designates a tubular member or sleeve fixedly attached at its lower end to the hub of the operating cross-head 18 aforesaid, and having its upper end flared outwardly to form an annular flange for stop engagement with the upper margin of the outlet neck 6 aforesaid, as well as for lifting and supporting engagement with the measuring hopper or cup above referred to.

20 designates one or more lateral orifices formed in the wall of the sleeve 19 intermediate its height, and which with said sleeve in a raised position registers with the interior of the main casing 5 to permit a free outflow of fluid therefrom. In a lowered position of the sleeve 19 said orifices are closed by contact with the inner face of the neck 6 to prevent such outflow through said orifice.

21 designates the measuring hopper or cup above referred to, preferably formed of glass or like transparent material, arranged centrally within the main casing 5, and to such end is made smaller than the chamber of said casing. The upper end of the hopper or cup 21 is open and provided with an inturned flange or lip 22 at the side farthest removed from the valve housing 14 aforesaid, adapted to direct an overflow of liquid from the hopper 21 in a direction toward said valve housing to more effectively remove any syrup or the like adhering to said valve housing and accessories. At its lower end the hopper or cup 21 is formed with a centrally disposed outlet orifice or passage adapted to assume an open condition when the hopper or cup 21 is in its normal lowered position, and to assume a closed condition when the hopper or cup 21 is raised for active use as a measuring means. In the attainment of such results, as well as a clear way for the downward discharge of carbonated water or the like from the usual dispensing faucet 2 aforesaid, when the hopper or cup 2 is in its lowered position, a detail construction of said measuring hopper or cup 21 is preferably provided as follows:

The hopper or cup 21 is formed in two separate parts or halves, with the line of division central and vertical of the hopper or cup, and with said parts or halves pivotally connected together near their upper ends by yoke shape clip pieces 23 orificed for pivotal engagement with pivot lugs 24 on the outer faces and at the meeting edges of the parts or halves as shown. The lower ends of said parts or halves constituting the hopper or cup 21 have a cone form and are adapted to fit within the flaring upper end of the tubular member 19 of the cross-head 18 aforesaid, and so that an upward movement of said member 19 will first act to push the lower ends of the aforesaid parts or halves together into close contact along the line of vertical separation to attain a tight and liquid condition of the parts. Further upward movement of the tubular member 19 will effect a corresponding upward movement of the hopper or cup 21 in such liquid holding condition, to automatically operate the valve head 16 aforesaid, by means as follows:—

25 designates an inwardly extending lug carried by one of the parts or halves of the hopper or cup 21, in line with the lower end of the stem 17 of said valve, and adapted in the final upward movement of the hopper or cup 21 to raise said valve head 17 from its seat and permit the flow of liquid past the valve head into said hopper or cup, as set forth in the operation of the present invention.

26 designates bearing shoulders formed on the sides of the parts or halves of the hopper or cup 21 aforesaid, and adapted for supporting bearing on the before described abutment ledges 8 of the main casing 5, so that with said shoulders 26 resting on the ledges 8, the parts or halves of the hopper or cup 21 will move under gravity stress into the open condition illustrated in Fig. 3, after the operating cross-head 18 and tubular member 19 are allowed to assume their normal or inactive lowered position.

27 designates the supply tank for the syrup or like liquid to be disposed, and which is usually located in a plane above the dispensing mechanism so as to operate by gravity, and preferably by means as follows:

28 designates a split bracket clamp secured by clamping bolts 29 around the standard or goose neck 1 aforesaid, and with an upper pair of its lugs having spaced relation to receive the flat lower end of a socket head 30 in a pivotally adjustable manner, with the lower end of the supply tank 27 connected to the socket head 30 by an intermediate tubular post 31 as shown. With such construction, the supply tank 27 can be assembled in proper vertical position on widely different forms of standards or goose necks 1 in a ready and convenient manner.

32 designates a flexible conductor connecting the base of the socket head 30 with the heretofore described inlet neck 13 of the main casing 5, and adapted to conduct a supply of syrup or the like into the valve housing 14 of said casing.

The operation of the present improvement is as follows:—

First mode: In dispensing a desired quantity of syrup or the like from the supply tank 27, the dispenser presses with the margin of a drinking glass against the operating cross head 18 to cause an upward movement of the same and its associated parts including the measuring hopper or cup 21. As the said hopper or cup 21 nears the end of its final upward movement its lug 25 engages against the lower end of the valve stem 17 and raises the valve head 16 to permit a flow of syrup or the like down into the measuring hopper or cup 21 until the desired quantity is collected therein and which can be visually ascertained by dispenser owing to the transparent nature of the main casing 5 and measuring hopper or cup 21. The described parts are then permitted to descend by gravity to their lowered position, when the parts or halves of the measuring hopper or cup 21 will automatically open to discharge the measured quantity of syrup or the like down through the tubular member of sleeve 19 into the drinking glass held in proper position by the dispenser beneath said member or sleeve 19. The subsequent filling of such drinking glass with carbonated water or the like can be effected in the usual manner by a proper manipulation of the faucet 1, and in such last mentioned operation the open condition of the parts or halves of the measuring hopper or cup 21 provides an uninterrupted passage for the downward passage of the carbonated water or the like into its drinking glass.

Second mode: After the measuring hopper or cup 21 has received the measured quantity of syrup or the like as above described, said hopper or cup is permitted by the dispenser to descend a sufficient distance to permit the valve head 16 to close and shut-off a further flow of the syrup or the like, and with the measuring hopper or cup held at such point, in which it still retains its liquid tight closed condition, the faucet 1 is manipulated to discharge a fine stream of carbonated water or the like through the lower outlet neck 3 down into said hopper or cup, to mix with the syrup or the like and overflow the top of said hopper or cup and down through the main casing 5 and outlet neck 6 into the drinking glass in a thoroughly mixed and "all foam" form of a drink.

Third mode: Instead of the manipulation of the faucet 1 in manner above described to obtain a thin stream of carbonated water or the like, said valve is manipulated to afford a coarser or spray like discharge by the spreader head 4, to produce a mixed drink with but little foam and specially adapted for dispensing coca-cola and the like beverages.

Having thus fully described my said invention what I claim as new and desire to secure by Letters Patent, is:—

1. In a liquid dispensing apparatus of the type described, the combination of an inclosing casing having a bottom outlet, means for introducing a supply of fluid into said casing, a valve controlling said supply, a measuring hopper arranged in said casing and having operative engagement with said valve, said hopper having a valved lower end affording a clear vertical passageway in its opened condition, means for imparting vertical movement to said hopper, and a liquid dispensing faucet having connection with the upper end of said casing in vertical alinement with the measuring hopper, substantially as set forth.

2. In a liquid dispensing apparatus of the type described, the combination of an inclosing casing having a bottom outlet, means for introducing a supply of fluid into said casing, a valve controlling said supply, a measuring hopper arranged in said casing and having operative engagement with said valve, the said hopper comprising two parts pivotally connected together at their upper ends and having a vertical line of separation, means for imparting vertical movement to said hopper, and a liquid dispensing faucet having connection with the upper end of said casing in vertical alinement with the measuring hopper, substantially as set forth.

3. In a liquid dispensing apparatus of the type described, the combination of an inclosing casing comprising a main body portion having a bottom outlet and a cap portion formed with an attaching neck and a valve housing, a valve in said housing controlling a fluid supply to the casing aforesaid, a measuring hopper arranged in said casing and having operative engagement with said valve, said hopper having a valved lower end affording a clear vertical passageway in its opened condition, means for imparting vertical movement to said hopper, and a liquid dispensing faucet having connection with the upper end of said casing in vertical alinement with the measuring hopper, substantially as set forth.

4. In a liquid dispensing apparatus of the type described, the combination of an inclosing casing comprising a main body portion having a bottom outlet and a cap portion formed with an attaching neck and a valve housing, a valve in said housing controlling a fluid supply to the casing aforesaid, a measuring hopper arranged in said casing and having operative engagement with said valve, said hopper comprising two parts pivotally connected together at their upper ends and having a vertical line of separation, means for imparting vertical movement to said hopper, and a liquid dispensing faucet having connection with the upper end of the casing in vertical alinement with the measuring hopper, substantially as set forth.

5. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, said hopper having a valved lower end affording a clear vertical passageway in its opened condition, means for imparting vertical movement to said hopper, and a liquid dispensing faucet having connection with the casing in vertical alinement with the measuring hopper, substantially as set forth.

6. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, and comprising two parts pivotally connected together at their upper ends and having a vertical line of separation, means for imparting vertical movement to said hopper, and a liquid dispensing faucet having connection with the upper end of the casing aforesaid, substantially as set forth.

7. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, said hopper having a valved lower end affording a clear vertical passageway in its opened condition, the aforesaid outlet neck of the inclosing casing having vertical guide slots, a cross-head having guiding engagement with said slots and operative engagement with the measuring hopper, and a liquid dispensing faucet having connection with the casing in vertical alinement with the measuring hopper, substantially as set forth.

8. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve and comprising two parts pivotally connected together at their upper ends and having a vertical line of separation, the aforesaid outlet neck of the inclosing casing having vertical guide slots, a cross-head having guiding engagement with said slots and operative engagement with the measuring hopper, and a liquid dispensing faucet having connection with the upper end of the casing aforesaid, substantially as set forth.

9. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, said hopper having a valved lower end affording a clear vertical passageway in its opened condition, the aforesaid outlet neck of the inclosing casing having vertical guide slots, a cross-head having horizontal arms in guiding engagement with said guide slots, a cylindrical sleeve attached to said cross-head and having a flared upper end for operative engagement beneath the measuring hopper, and a liquid dispensing faucet having connection with said casing in vertical alinement with the measuring hopper, substantially as set forth.

10. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, said hopper having a valved lower end affording a clear vertical passageway in its opened condition, the aforesaid outlet neck of the inclosing casing having vertical guide slots, a cross-head having horizontal arms in guiding engagement with said guide slots, a cylindrical sleeve having lateral orifices intermediate its height and a flared upper end for operative engagement beneath the measuring hopper, and a liquid dispensing faucet having connection with said casing in vertical alinement with the measuring hopper, substantially as set forth.

11. In a liquid dispensing apparatus of the type described, the combination of an inclosing casing having an outlet neck at its lower end and inner supporting ledges intermediate its height, a valve housing and valve head arranged at the upper end of said casing, a measuring hopper arranged in said casing and comprising two parts pivotally connected together at their upper ends and having a vertical line of separation and provided with individual shoulders for bearing upon the ledges aforesaid, said hopper being adapted for operative engagement with the valve head aforesaid, means for imparting vertical movement to said hopper, and a liquid dispensing faucet associated with said casing in vertical alinement with said hopper, substantially as set forth.

12. In a liquid dispensing apparatus of the type described, the combination of an inclosing casing having an outlet neck at its lower end and inner supporting ledges intermediate its height, a valve housing and valve head arranged at the upper end of said casing, a measuring hopper arranged in said casing and comprising two parts having a vertical line of separation and provided with pivot lugs near their upper ends, yoke shaped clips engaging said lugs, said hopper parts having individual shoulders for bearing upon the ledges aforesaid, means for imparting vertical movement to said hopper, and a liquid dispensing faucet associated with said casing in vertical alinement with said hopper, substantially as set forth.

13. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve, said hopper having a valved lower end affording a clear vertical passageway in its opened condition and a deflecting flange at one side and near its upper end, means for imparting vertical movement to said hopper, and a liquid dispensing faucet associated with said casing in vertical alinement with the said hopper substantially as set forth.

14. In a liquid dispensing apparatus of the type described, the combination of an inclosing casing provided with an outlet neck at its lower end, a valve and valve housing arranged within said casing near its upper end and controlling a fluid supply, a measuring hopper arranged in said casing and having operative engagement with said valve and comprising two parts pivotally connected together at their upper ends and having a vertical line of separation, one of said parts having a deflecting flange at one side and near its upper end, means for imparting vertical movement to said hopper, and a liquid dispensing faucet associated with said casing in vertical alinement with said hopper, substantially as set forth.

15. In a liquid dispensing apparatus of the type described, the combination of an inclosing casing having an outlet neck at its lower end and inner supporting ledges intermediate its height, a valve housing and valve head arranged at the upper end of said casing, a measuring hopper arranged in said casing and comprising two parts pivotally connected together at their upper ends and having a vertical line of separation and provided with individual shoulders for bearing upon the ledges aforesaid, said hopper having an inwardly projecting lug for operative engagement with the valve head aforesaid, means for imparting vertical movement to said hopper, and a liquid dispensing faucet associated with said casing in vertical alinement with said hopper, substantially as set forth.

16. In a liquid dispensing apparatus of the type described, the combination of a dispensing faucet and a fluid measuring means arranged in associated relation, a curved standard supporting the same, and a supply tank for the measuring means secured to the standard in a pivotally adjustable manner by a split coupling and connecting bolts, substantially as set forth.

Signed at Chicago, Illinois, this 27th day of May, 1919.

STANLEY H. KNIGHT.